United States Patent [19]

Sugamo et al.

[11] Patent Number: 5,144,014
[45] Date of Patent: Sep. 1, 1992

[54] PROCESS FOR PRODUCTION OF MONOAZO LAKE COATED WITH WATER-INSOLUBLE METAL SALT OF ROSIN

[75] Inventors: Hitoshi Sugamo; Nobuyuki Tomiya; Yusuke Watabe, all of Tokyo, Japan

[73] Assignee: Toyo Ink Manufacturing Co., Ltd., Tokyo, Japan

[21] Appl. No.: 564,312

[22] Filed: Aug. 8, 1990

[30] Foreign Application Priority Data

Aug. 11, 1989 [JP] Japan ................................. 1-208550

[51] Int. Cl.$^5$ ........................ C09B 63/00; C09D 11/00
[52] U.S. Cl. ................................ 534/573; 534/581; 534/739; 534/874; 534/882; 106/23; 106/496
[58] Field of Search .......................... 534/573, 739, 874, 534/882

[56] References Cited

U.S. PATENT DOCUMENTS

| | | | |
|---|---|---|---|
| 2,350,522 | 6/1944 | O'Neal | 534/882 X |
| 3,036,059 | 5/1962 | Ehrhardt et al. | 534/739 X |
| 4,143,036 | 3/1979 | Stefancsik | 534/874 |

FOREIGN PATENT DOCUMENTS 703845 2/1954 United Kingdom ................ 534/573

Primary Examiner—Mary C. Lee
Assistant Examiner—Fiona T. Powers
Attorney, Agent, or Firm—Wenderoth, Lind & Ponack

[57] ABSTRACT

A monoazo lake which comprises a monoazo dye, a lake-forming metal and a water-insoluble metal salt of a rosin, and which is coated with the water-insoluble water salt of the rosin, the lake-forming metal being at least one metal selected from calcium, barium and strontium, the metal of the water-insoluble metal salt being at least one metal selected from zinc, aluminum, copper and manganese, and a process for the production of a monoazo lake coated with a water-insoluble metal salt of a rosin, which comprises carrying out the following steps (1) and (2) in the order of (1) to (2) or (2) to (1):

(1) a step of forming a monoazo lake by forming a lake of a monoazo dye with a metal salt of at least one metal for formation of a lake of the monoazo dye selected from calcium, barium and strontium, and (2) a step of forming the water-insoluble metal salt of the rosin by insolubilizing the rosin with a metal salt of at least one metal for insolubilization of the rosin selected from zinc, aluminum, copper and manganese.

16 Claims, No Drawings

PROCESS FOR PRODUCTION OF MONOAZO LAKE COATED WITH WATER-INSOLUBLE METAL SALT OF ROSIN

FIELD OF THE INVENTION

This invention relates to a monoazo lake useful in various products, a printing ink and a coating composition in particular, a dispersion of the monoazo lake, and a process for the production of the monazo lake. More specifically, it relates to a monazo lake which has improved lipophilic nature and therefore has improved water resistance, a dispersion of the monoazo lake, and a process for the production of the monoazo lake.

PRIOR ART

A monoazo lake, which is produced by coupling an aromatic amine having a soluble group as a diazo component with $\beta$-hydroxynaphthoic acid, $\beta$-naphthol, or the like as a coupler component and forming a lake of the resultant monoazo dye, has conventionally found its use in various fields such as printing inks, coating compositions and coloring of plastic products. The monoazo lake has been treated with rosin in order to obtain a transparent and clear color tone and improve dispersibility. The rosin-treatment is usually carried out as follows. A solution of an alkali metal salt of rosin (rosined soap) is added to the coupler component or dye, and a lake-forming metal salt, e.g. calcium chloride, is then added to precipitate an insoluble metal salt of the rosin on a lake surface.

A rosin-treated monoazo lake produced as above has improved clearness and dispersibility. When such a lake is used in a lithographic ink for offset printing (to be referred to as "offset ink" hereinafter), however, the rosin-treatment is considered to be one of the causes for a decrease in printability, water resistance-related troubles in particular.

SUMMARY OF THE INVENTION

It is an object of this invention to provide a monoazo lake which is coated with a water-insoluble rosin and has improved lipophilic nature and improved water resistance, a dispersion comprising the monoazo lake and a vehicle, and a process for the production of the monoazo lake.

It is another object of this invention to provide a monozao lake which is coated with a water-insoluble rosin and capable of giving excellent printability without impairing transparency, clearness and dispersibility a dispersion of the monoazo lake in a vehicle, and a process for the production of the monoazo lake.

According to this invention, there is provided a monoazo lake which comprises a monoazo dye, a lake-forming metal and a water-insoluble metal salt of a rosin, and which is coated with the water-insoluble metal salt of the rosin, the lake-forming metal being at least one metal selected from calcium, barium and strontium, the metal of the water-insoluble metal salt being at least one metal selected from zinc, aluminum, copper and manganese.

According to this invention, there is also provided a dispersion comprising the above monoazo lake coated with a water-insoluble metal salt and a vehicle.

According to this invention, there is further provided a process for the production of a monoazo lake coated with a water-insoluble rosin metal salt, which comprises carrying out the following steps (1) and (2) in the order of (1) to (2) or (2) to (1):

(1) a step of forming a lake of a monoazo dye with a metal salt of at least one metal selected from calcuim, barium and strontium for formation of a lake of the monoazo dye, and (2) a step of insolubilizing a rosin with a metal salt of at least one metal selected from zinc, aluminum, copper and manganese for insolubilization of the rosin to form a water-insoluble rosin metal salt.

DETAILED DESCRIPTION OF THE INVENTION

A monoazo lake is formed by subjecting to a lake formation step a dye which is obtained by coupling a diazo component converted from an aromatic amine with a coupler component, In this invention, the monoazo lake contains at least one metal selected from calcium, barium and strontium as a metal for formation of a lake of a monoazo dye and at least one metal selected from zinc, aluminum, copper and manganese as a metal for water-insolubilization of a rosin and is coated with a water-insoluble rosin metal salt.

The diazo component is that which is obtained by converting an aromatic amine having a soluble group into a diazo form. Examples of such an aromatic amine are 1-amino-4-methylbenzene-2-sulfonic acid (p-toluidine-m-sulfonic acid), 1-amino-4-methyl-5-chlorobenzene-2-sulfonic acid, 1-amino-4-chloro-5-methylbenzene-2-sulfonic acid, 1-amino-4-methylbenzene-3-sulfonic acid, and 1-amino-3-methyl -4-sulfonic acid.

A typical example of the coupler component is $\beta$-naphthoic acid, and $\beta$-naphthol and acetoacetanilide may be used. Further, derivatives of these coupler components, e.g. those substituted with a lower alkyl group, an alkoxy group or a halogen atom may be also used.

The monoazo lake used in this invention can be produced according to a known process for the production of a conventional monoazo lake. That is, a diazo component is formed by converting an aromatic amine having a soluble group into a diazo form according to a usual method. A coupler component is added to the diazo component and coupled with it according to a conventional method. Then, the resultant monoazo dye is formed into a lake with a lake-forming agent. Otherwise, a lake-forming agent is preliminarily added to a diazo component or a coupler component, and these two components are then coupled. Calcium, barium or strontium is used as a metal for formation of a lake.

A rosin, which is considered to have an effect as a dispersant and a crystal growth inhibitor, is incorporated into a coupler component or the dye in advance, and the amount of the rosin is preferably 2 to 50% by weight based on the monoazo dye.

This invention has a feature in that the metal for lake formation and the metal for insolubilization of the rosin are different from each other, A lake slurry obtained by the above coupling reaction and lake-forming reaction contains a lake, a rosin metal salt, salts, unreacted materials, an excess metal ion of a metal for the lake formation, and the like. The slurry is subjected to a post-treatment in which metals bound to the lake are retained and only metals bound to the rosin are removed and replaced with a different metal.

Specifically, the slurry was adjusted to pH of between 5 and 3 to selectively dissociate only metals bound to the rosin. Inorganic acids such as hydrochloric acid and organic acids such as acetic acid are preferred as an acid.

In order to remove metals dissociated from the rosin metal salt and the excess lake-forming metal, the following methods are available.

(1) A method in which the slurry which has been adjusted to pH of between 5 and 3 is filtered and washed to remove free metals.

(2) A method in which said slurry is subjected to ion-exchange using an ion-exchange membrane to remove free metals.

(3) A method in which sodium sulfate is added to said slurry to precipitate free metals as a sulfate.

Of these methods, the method (1) is economically preferred, although this invention shall not be limited to these methods.

A mixture of a rosin acid with a lake prepared by removing free metals, e.g. a mixture cake obtained by the above method (1), is formed into a slurry, and the slurry is adjusted to pH of 9 to 12, preferably about 11.0 by adding sodium hydroxide, ammonium hydroxide, or the like, whereby the slurry contains a lake and a rosined soap. Then, the rosined soap in the slurry is insolubilized by adding a rosin-insolubilizing metal salt, and the slurry is adjusted to pH of about 4.0 to 11.5, whereby a monoazo lake coated with a water-insoluble rosin metal salt, provided by this invention, is obtained. Preferred as a rosin-insolubilizing metal salt is a salt of at least one metal selected from zinc, aluminum, copper and manganese, such as hydrochloride, nitrate, sulfate, and the like. And, the resultant salt of zinc, aluminum, copper or manganese with the rosin has a small solubility to water as compared with other metal salts and effectively improves the lipophilic nature of the lake. Hence, the resultant lake give improved printability. The solubility to water is nearly exactly determined by extracting metal salts of rosin in water and measuring the surface tension and specific electric conductivity of the extraction water.

In this invention, the monoazo lake coated with a water-insoluble rosin metal salt can be also produced by the following methods.

(1) A slurry of a monoazo dye and a water-soluble salt of a rosin, e.g. an alkali metal or ammonium salt of a rosin is adjusted to pH of 9 to 12, preferably about 11, and a salt of a metal for water-insolubilization of the rosin in a stoichiometric reacting amount required to insolubilize the rosin is added to the slurry. Then, the slurry is adjusted to pH of about 7.5 to 11.5 to precipitate a water-insoluble rosin salt. And, a salt of a lake-forming metal is added to form a lake of the dye.

(2) A metal salt for water-insolubilization of a rosin is added to a slurry of a rosin-coated lake of a mixture of a monoazo dye with a rosin, and the slurry is adjusted to pH of about 4.0 to 11.5 to replace a lake-forming metal attached to the rosin with a metal for water insolubilization.

The lake dispersion of this invention comprises the above monoazo lake coated with a water-insoluble rosin metal salt and a vehicle for dispersion of a resin.

The vehicle for printing inks is as follows. The vehicle for an offset ink comprises 20 to 50 parts by weight of a rosin-modified phenolic resin, petroleum resin, alkyd resin or drying oil-modified resin of these, 0 to 30 parts by a plant oil such as linseed oil, tung oil or soybean oil, and 10 to 60 parts by weight of a solvent such as n-paraffin, isoparaffin, an aromatic hydrocarbon, napthene or α-olefin. An offset printing ink composition is prepared by incorporating a monoazo lake of this invention into the vehicle for an offset ink and suitably adding known additives such as other ink solvent, a dryer, levelling improver, thickener, and the like.

The vehicle for a gravure ink comprises 10 to 50 parts by weight of a gum rosin, wood rosin, tall oil rosin, calcified rosin, lime rosin, rosin ester, maleic resin, gilsonite, dammar, shellac, polyamide resin, vinyl resin, nitrocellulose, cyclorubber, ethyl cellulose, cellulose acetate, ethylene-vinyl acetate copolymer resin, urethane resin, polyester resin or alkyd resin, 30 to 80 parts by weight a solvent such as of n-hexane, toluene, ethanol, methanol, acetone, ethyl acetate, ethyl lactate, cellosolve, diacetone alcohol, chlorobenzene, ethyl ether, acetal ethyl ether, ethyl acetoacetate, or butyl acetate cellosolve, 3 to 35 parts by weight of the monoazo lake of this invention, 0 to 20 parts by weight of an extending pigment such as barium sulfate, barium carbonate, calcium carbonate, gypsum, alumina white, clay, silica, silica white, talc, calcium silicate or precipitating magnesium carbonate, and other auxiliaries such as a plasticizer, ultraviolet inhibitor, antioxidant, antistatic agent, and the like.

In this invention, the coating composition comprises 0.1 to 15% by weight of the monoazo lake of this invention, 99.9 to 55% by weight of a vehicle for a coating composition, and 0 to 30% by weight of other auxiliary and/or an extending pigment. The vehicle for the coating composition comprises 80 to 20% by weight of an acrylic resin, alkyd resin, epoxy resin, chlorinated rubber, vinyl chloride, synthetic resin emulsion, silicone resin, water-soluble resin, polyurethane, polyester, urea resin or a mixture of these, and 60 to 10% by weight of a hydrocarbon, alcohol, ketone, ether alcohol, ether, ester or water.

This invention will be explained hereinbelow by reference to Examples, in which "part" stands for "part by weight" and "%" for "% by weight".

EXAMPLE 1

A diazo component was prepared as follows. 90.6 Parts of 1-amino-4-methylbenzene-2-sulfonic acid, 2.9 parts of 1-amino-4-methylbenzene-3-sulfonic acid and 1.8 parts of 1-aminonaphthalene-1-sulfonic acid were dissolved in a solution consisting of 1,500 parts of water and 20 parts of sodium hydroxide.

124 Parts of 35% hydrochloric acid was added to the resultant mixture to carry out acid precipitation. Then, 1,000 parts of ice was added, and the mixture was cooled to 0° C. A solution of 35 parts of sodium nitrite in 100 parts of water was added, the mixture was stirred at not more than 3° C. for 30 minutes.

Separately, a coupler component was prepared as follows. 95 Parts of β-hydroxynaphthoic acid was dissolved in a solution consisting of 3,000 parts of water and 51 parts of sodium hydroxide, and the resultant mixture was cooled to 15° C.

The diazo component was added dropwise to the coupler component over 20 minutes to carry out a coupling reaction. The reaction mixture was stirred for 30 minutes, and then, 509 parts of 10% rosined soap (24% as a resin solid content based on dyestuff) was added. The mixture was adjusted to pH of 11.5 by adding a 1% sodium hydroxide aqueous solution. Thereafter, 300 parts of a 35% calcium chloride aqueous solution was added, and the resultant mixture was stirred for 3 hours to complete a lake-forming reaction.

A 3% hydrochloric acid solution was carefully added to adjust the mixture to pH of 5.0. The mixture was stirred at room temperature for 1 hour to dissociate calcium of the rosin calcium, whereby a mixture of calcium ion and rosin acid were formed. Then, the mixture was filtered and the resultant solid washed with water to remove the calcium ion, unreacted materials and salts. A slurry was prepared by adding 5,000 parts of water to the resultant cake, and the slurry was adjusted to pH of 11.0 with a 1% sodium hydroxide. The slurry was stirred at room temperature for 1 hour to convert the rosin acid to rosined soap, and a solution of 31 parts of zinc nitrite in 200 parts of water was added to form zinc rosin, whereby the rosin was insolubilized. The pH of the slurry decreased to 6.5, and the slurry was adjusted to pH of 10.0 by adding 1% sodium hydroxide solution.

The resultant slurry was stirred at room temperature for 1 hour and filtered, and the resultant solid was washed with water, dried and milled to give 263 parts of a monoazo lake.

For comparison, a lake (according to a conventional process) was prepared by repeating the above procedure except that no zinc substitution was carried out.

The monoazo lake obtained above according to this invention ("present lake A" hereinafter) and the above lake for comparison ("conventional lake A" hereinafter) were measured for a contact angle. The conventional lake A had a contact angle, to water, of 40°, and the present lake A had a contact angle, to water, of 48°. Further, concerning methylene iodide, the conventional lake A had a contact angle of 25°, and the present lake A had a contact angle of 20°. Thus, the present lake A has high hydrophobic nature and high lipophilic nature as compared with the conventional lake A.

The conventional lake A was measured for a heat of wetting to water by using a calorimeter to show 5.3 cal/g, and the present lake A was measured in the same way to show 3.4 cal/g.

The specific electric conductivity of an extraction water used for each of the conventional and present lakes A was measured as follows. 5 Grams of a lake sample were suspended in 200 cc of distilled water, and the suspension was stirred at 85° C. for 1 hour and cooled to room temperature. Solids were filtered off by using a No. 6 c filter paper, and the filtrate was measured for a specific electric conductivity. This measurement showed that the conventional lake A had a specific electric conductivity of 130 us/cm and the present lake A, 30 us/cm.

The conventional lake A had a surface tension of 60.4 dyn/cm, and the present lake A, 68.3 dyn/cm. Thus, the amount of an eluate from the present lake A into water is smaller than that from the conventional lake A.

An offset ink using each of the above present and conventional lakes A was tested. That is, a varnish was prepared by adding 20 parts of linseed oil and 30 parts of No. 5 solvent (ink solvent, supplied by Nippon Oil Co., Ltd.) to 50 parts of Tamanol 361 (rosin-modified phenolic resin, supplied by Arakawa Chemical Co., Ltd.), and heating the mixture at 200° C. 2 Parts of aluminum octylate was added to 98 parts of the varnish to prepare a gelled varnish.

70 Parts of the gelled varnish, 20 parts of a lake sample and 10 parts of a No. 1 solvent (ink solvent, supplied by Nippon Oil Co., Ltd.) were mixed together, and kneaded with a three-roll mill to give an offset ink having a tack value of 9.0.

The offset ink using the present lake A had excellent dispersibility over the offset ink using the conventional lake A [coarse particles of the conventional lake A disappeared in three passes, whereas those of the present lake A disappeared in two passes (the term "pass" stands for a number of a lake passing the three-roll mill)]. These two offset inks showed nearly identical transparency, clearness and coloring power (observed by the eyes). However, the offset ink using the present lake A exhibited a smaller emulsification change (a change in fluidity when water is forcibly emulsified in an ink) than the offset ink using the conventional lake A. And, the offset ink using the present lake A had a higher apparent surface tension, and an extraction water which was obtained by emulsifying 1 part of the ink in 2 parts of distilled water and filtering and which contained a water-soluble portion of the ink had a high surface tension. Table 1 shows the results.

TABLE 1

|  |  | Conventional lake A | Present lake A |
|---|---|---|---|
| Emulsification change | radius value[1] | +0.35 | +0.15 |
|  | slope[1] | −0.25 | +0.10 |
| Apparent surface tension | (dyn/cm) | 50.2 | 54.5 |
| Surface tension of emulsified water | (dyn/cm) | 59.5 | 68.5 |

[1]Measurement by a spread o meter.

The above procedure up to formation of a rosined soap from a rosin acid was repeated, and then, as a different metal for insolubilization of a rosin, a solution of 7.6 parts of manganese chloride in 200 parts of water or a solution of 7.2 parts of cupric chloride in 200 parts of water and a solution of 20.5 parts of aluminum sulfate in 200 parts of water were added, and the resultant mixtures were treated in the same way as above to give 236 parts and 237 parts of monoazo lakes ("present lakes A-2" hereinafter), respectively.

For comparison, a lake ("conventional lake A-2" hereinafter) was prepared by repeating the above procedure except that no metal substitution treatment on a rosin was carried out after the coupling and lake-forming reaction.

Table 2 shows physical properties of the lakes A-2 obtained above.

TABLE 2

| Rosin treatment with: | Heat of wetting (cal. g) | Specific electric conductivity of extraction water (us/cm) | Surface tension extraction water (dyn/cm) |
|---|---|---|---|
| Aluminum | 3.3 | 28 | 71.2 |
| Manganese | 3.5 | 30 | 69.8 |
| Copper | 3.6 | 33 | 68.4 |
| No treatment | 4.9 | 125 | 61.8 |

The present lakes A-2 obtained after rosin treatment with a different metal had higher hydrophobic nature than the conventional lake A-2 treated with no different metal. Further, the extraction water used for the present lakes A-2 had low specific electric conductivity and high surface tension, which shows that the amount of eluate from the present lakes into water was smaller.

EXAMPLE 2

92 Parts of 1-amino-4-methylbenzene-2-sulfonic acid and 9.2 parts of 1-amino-4-methylbenzene-3-sulfonic acid were converted to a diazo form according to a conventional method, and 300 parts of a 35% calcium chloride aqueous solution was added to prepare a diazo solution.

Separately, 95 parts of β-hydroxynaphthoic acid was dissolved according to a conventional method, and 212 parts of a 10% rosined soap was added (10% based on a dyestuff content) to prepare a coupler solution. The diazo solution was added dropwise to the coupler solution over 20 minutes, and a coupling reaction and a lake-forming reaction were carried out. The reaction mixture (after the coupling and lake-forming reactions) had pH of 12.0. After the reaction mixture was stirred for 3 hours, a 3% hydrochloric acid solution was carefully added to adjust it to pH of 3.0.

The reaction mixture was stirred at room temperature for 1 hour and filtered, and the resultant solid was washed with water. A slurry of the resultant cake was prepared, and adjusted to pH of 11.0 with 1% sodium hydroxide. The slurry was stirred at room temperature for 1 hour, and a solution of 14 parts of aluminum sulfate in 200 parts of water was added. The pH of the slurry, which had been decreased to pH of 3.5, was adjusted to 9 with a 1% sodium hydroxide aqueous solution. The slurry was stirred at room temperature for 1 hour and filtered. The resultant solid was washed with water, dried and milled to give 234 parts of a monoazo lake.

For comparison, a lake ("conventional lake B" hereinafter) was prepared by carrying out no aluminum substitution treatment on a rosin after the coupling and lake-forming reaction.

The lake obtained in this Example ("present lake B" hereinafter) and the conventional lake B were measured for physical property values in the same way as in Example 1. The contact angle and heat of wetting of the present lake B showed that the present lake B had high hydrophobic nature and high lipophilic nature as compared with the conventional lake B. Further, the extraction water used for the present lake B had low specific electric conductivity and high surface tension as compared with the extraction water used for the conventional lake B.

A gravure ink using the present lake B and a gravure ink using the conventional lake B were tested to show that the gravure ink using the present lake B had excellent transparency, clearness and coloring power over the gravure ink using the conventional lake B. The test was carried out as follows.

| Lake | 10 parts |
| Limed rosin varnish | 90 parts |
| (solid content 20%, toluene 75%, plasticizer 5%) | |
| 3 mmφ glass beads | 100 parts |

The above components were charged into a 220 cc glass bottle, and shaken by using a paint conditioner for 2 hours to give a high-density ink.

The ink using the present lake B had a larger 60° gloss by 7% than the ink using the conventional lake B.

Further, a light-color ink was prepared by incorporating 10 parts of a white ink into the high-density ink, and tested for its coloring power. The light-color ink using the present lake B showed higher coloring power by about 5% than that using the conventional lake B.

| Lake | 8 parts |
| Alkyd resin varnish | 50 parts |
| Melamine resin varnish | 30 parts |

| -continued | |
| --- | --- |
| Thinner | 12 parts |
| 2 mmφ steel beads | 300 parts |

A composition of the above components were shaken for 90 minutes by using a paint conditioner to obtain an oil coating composition. The coating composition using the present lake B had excellent coloring power and gloss over the coating composition using the conventional lake B.

EXAMPLE 3

125 Parts of sodium 1-amino-4-methyl-5-chloro-2-sulfonate was dissolved in 1,500 parts of water. 112 Parts of 35% hydrochloric acid was added to carry out acid precipitation, and allowed to stand until the temperature thereof became a room temperature. Then, 1,000 parts of ice was added, and cooled to 0° C. A solution of 35 parts of sodium nitrite in 100 parts of water was added, and the mixture was stirred at a temperature of not more than 3° C. to obtain a diazo component.

Separately, 95 parts of β-hydroxynaphthoic acid was dissolved according to a conventional method, and 212 parts (10% based on dyestuff content) of a rosined soap was added to obtain a coupler component.

The diazo component was added dropwise to the coupler component over 20 minutes to carry out a coupling reaction. The coupling reaction product was stirred for 30 minutes, and heated to 80° C, and 125 parts of barium chloride was added to complete a lake-forming reaction.

The reaction product was filtered, and the resultant solid was washed with water. A slurry of the resultant cake was prepared, and adjusted to pH of 11.0 with 1% sodium hydroxide salt. The slurry was stirred at room temperature for 1 hour, and a solution of 14 parts of aluminum sulfate in 200 parts of water was added. The slurry was adjusted to pH of 9.0, and then filtered. The resultant solid was washed with water, dried and milled to give 238 parts of a monoazo lake.

For comparison, a lake ("conventional lake C" hereinafter) was prepared in the same way above except that no aluminum substitution was carried out.

The lake of this Example ("present lake C" hereinafter) and the conventional lake C were measured for physical property values in the same way as in Example 1 or 2.

The measurement values for contact angle and heat of wetting showed that the present lake C had higher hydrophobic nature than the conventional lake C. Further, the extraction water used for the present lake C had a lower specific electric conductivity and a higher surface tension than that used for the conventional lake C.

EXAMPLE 4

125 Parts of sodium 1-amino-4-methyl-5-chloro-2-sulfonate was added to 1,500 parts of water. 112 Parts of hydrochloric acid was added to carrry out acid precipitation, and then, the mixture was allowed to stand until the temperature thereof because room temperature, 1,000 Parts of ice was added, and the mixture was cooled to 0° C. A solution of 35 parts of sodium nitrite in 100 parts of water was added, and the mixture was stirred at not more 3° C. to obtain a diazo component.

Separately, 95 parts of β-hydroxynaphthoic acid was dissolved according to a conventional method, and 212 parts (10% based on dyestuff content) of 10% rosined soap was added to obtain a coupler component.

The diazo component was added to the coupler component over 20 minutes to carry out a coupling reaction, the reaction mixture was stirred for 30 minutes and then, heated to 50° C. Then, 188 parts of strontium chloride was added to complete a lake-forming reaction. The reaction mixture was filtered and the resultant solid was washed with water.

A slurry of the resultant cake was adjusted to pH of 11.0 with a 1% sodium hydroxide salt, and stirred at room temperature for 1 hour. Then, a solution of 14 parts of aluminum sulfate in 200 parts of water was added. The slurry was adjusted to pH of 9.0, and filtered. The resultant solid was washed with water, dried and milled to give 238 parts of a monoazo lake "present lake D".

For comparison, a lake ("conventional lake D" hereinafter) was prepared in the same way above except that no aluminum substitution was carried out.

The measurement values for contact angle and heat of wetting showed that the present lake D had higher hydrophobic nature than the conventional lake D. Further, the extraction water used for the present lake D had a lower specific electric conductivity and a higher surface tension than that used for the conventional lake D.

EXAMPLE 5

90.6 Parts of 1-amino-4-methylbenzene-2-sulfonic acid, 2.9 parts of 1-amino-4-methylbenzene-3-sulfonic acid and 1.8 parts of 2-aminonaphthalene-1-sulfonic acid were dissolved in a solution consisting of 1,500 parts of water and 20 parts of sodium hydroxide.

124 Parts of 35% hydrochloric acid was added to carry out acid precipitation Then, 1,000 parts of ice was added, and the mixture was cooled to 0° C. A solution of 35 parts of sodium nitrite in 100 parts of water was added, and the mixture was stirred at not more than 3° C. for 30 minutes to obtain a diazo component.

Separately, 95 parts of $\beta$-hydroxynaphthoic acid was dissolved in a solution consisting of 3,000 parts of water and 51 parts of sodium hydroxide, and the mixture was cooled to 15° C. to obtain a coupler component.

The diazo component was added dropwise to the coupler component over 20 minutes to carry out a coupling reaction. After the reaction mixture was stirred for 30 minutes, 509 parts (24% as a resin solid content based on dyestuff) of a 10% rosined soap was added, and the mixture was adjusted to pH of 11.5 with a 1% sodium hydroxide aqueous solution. A solution of 25 parts of zinc nitrate in 200 parts of water was added to precipitate rosin zinc. The pH of the slurry decreased to 8.5. The slurry was adjusted to pH of 11.0 with a 1% sodium hydroxide solution. Then, 300 parts of a 35% calcium chloride aqueous solution was added, and the slurry was stirred for 3 hours to complete a dye lake-forming reaction. The slurry was heated up to 60° C., and filtered, and the resultant solid was purified, dried and milled to give 264 parts of a monoazo lake ("present lake E" hereinafter).

For comparison, a lake ("conventional lake E" hereinafter) was prepared by repeating the above procedure except that no treatment with zinc nitrate was carried out.

The present lake E and the conventional lake E were measured for physical property values in the same way as in Example 1. The measurement values for contact angle and heat of wetting showed that the present lake E had higher hydrophobic and lipophilic nature than the conventional lake E. Further, the extraction water used for the present lake E had a lower specific electric conductivity and a higher surface tension than that used for the conventional lake E.

EXAMPLE 6

90.6 parts of 1-amino-4-methylbenzene-2-sulfonic acid, 2.9 parts of 1-amino-4-methylbenzene-3-sulfonic acid and 1.8 parts of 2-aminonaphthalene-1-sulfonic acid were dissolved in a solution consisting of 1,500 parts of water and 20 parts of sodium hydroxide.

124 Parts of 35% hydrochloric acid was added to carry out acid precipitation Then, 1,000 parts of ice was added, and the mixture was cooled to 0° C. A solution of 35 parts of sodium nitrite in 100 parts of water was added, and the mixture was stirred at not more than 3° C. for 30 minutes to obtain a diazo component.

Separately, 95 parts of $\beta$-hydroxynaphthoic acid was dissolved in a solution consisting of 3,000 parts of water and 51 parts of sodium hydroxide, and the mixture was cooled to 15° C. to obtain a coupler component.

The diazo component was added dropwise to the coupler component over 20 minutes to carry out a coupling reaction. After the reaction mixture was stirred for 30 minutes, 509 parts (24% as a resin solid content based on dyestuff) of a 10% rosined soap was added, and the mixture was adjusted to pH of 11.5 with a 1% sodium hydroxide aqueous solution. Then, 300 parts of a 35% calcium chloride aqueous solution was added and the mixture was stirred for 3 hours to complete a lake-forming reaction.

A solution of 14 parts of aluminum chloride in 200 parts of water was added to show that the pH of the mixture decreased to 6.0. The mixture was adjusted to pH of 7.0 with a 1% sodium hydroxide aqueous solution, heated to 60° C. and filtered. The resultant solid was purified, dried and milled to give a 264 parts of a monoazo lake ("present lake F" hereinafter).

For comparison, a lake ("conventional lake F" hereinafter) was prepared by repeating the above procedure except that no treatment with aluminum chloride was carried out.

The present lake F and the conventional lake F were measured for physical property values in the same way as in Example 1. The measurement values for contact angle and heat of wetting showed that the present lake F had higher hydropholic and lipophilic nature than the conventional lake F. Further, the extraction water used for the present lake F had a lower specific electric conductivity and a higher surface tension than that used for the conventional lake F.

What is claimed is:

1. A process for the production of a monoazo lake coated with a water-insoluble metal salt of rosin, which comprises:
    (a) adding a salt of at least one metal selected from the group consisting of calcium, barium and strontium for forming a lake of a monoazo dye to a mixed aqueous solution containing a monoazo dye having a soluble group and an alkali metal salt or ammonium salt of rosin to form a mixture of a monoazo lake with a rosin metal salt,
    (b) adjusting said mixture to pH of 3 to 5 to dissociate only a metal of the rosin metal salt and removing free metals, and (c) adjusting said resulting mixture to pH of 9 to 12 and then adding a salt of at least one metal selected from zinc, aluminum, copper and manganese for insolubilizing rosin in water to the mixture to form a rosin salt of the metal for insolubilizing rosin in water.

2. A process for the production of a monoazo lake coated with a water-insoluble metal salt of rosin, which comprises:
   (a) adding a salt of at least one metal selected from the group consisting of calcium, barium and strontium for forming a lake of a monoazo dye to a mixed aqueous solution containing a monoazo dye having a soluble group and an alkali metal salt or ammonium salt of rosin to form a mixture of a monoazo lake with a rosin metal salt, and
   (b) adding a salt of at least one metal selected from the group consisting of zinc, aluminum, copper and manganese for forming a lake of a monoazo dye to said mixture, and adjusting the resultant mixture to an acidic area of not less than pH 4 to replace only a metal of the rosin metal salt with the metal for insolubilizing rosin in water.

3. A process according to claim 1 wherein the monoazo dye is produced by a coupling reaction between a diazo compound and a coupler component.

4. A process according to claim 2 wherein the monoazo dye is produced by a coupling reaction between a diazo compound and a coupler component.

5. A process according to claim 3 wherein the diazo component is produced by converting an aromatic amine having a soluble group to a diazo form.

6. A process according to claim 4 wherein the diazo component is produced by converting an aromatic amine having a soluble group to a diazo form.

7. A process according to claim 5 wherein the soluble group is a sulfone acid group.

8. A process according to claim 6 wherein the diazo component is produced by converting an aromatic amine having a soluble group to a diazo form.

9. A process for the production of a monoazo lake dispersion which comprises dispersing the monoazo lake produced by the process of claim 1 in a vehicle.

10. A process for the production of a monoazo lake dispersion which comprises dispersing the monoazo lake produced by the process of claim 2 in a vehicle.

11. A process according to claim 1 wherein the metal salt of at least one metal for formation of a lake of the monoazo dye is a metal salt of an inorganic acid or an organic acid.

12. A process according to claim 2 wherein the metal salt of at least one metal for formation of a lake of the monoazo dye is a metal salt of an inorganic acid or an organic acid.

13. A process according to claim 1 wherein the metal salt of at least one metal for insolubilization of the rosin is a metal salt of an inorganic acid or an organic acid.

14. A process according to claim 2 wherein the metal salt of at least one metal for insolubilization of the rosin is a metal salt or an inorganic acid or an organic acid.

15. A process according to claim 1 wherein the rosin is used in such an amount that it is 2 to 50% by weight based on the monoazo dye.

16. A process according to claim 2 wherein the rosin is used in such as amount that it is 2 to 50% by weight based on the monoazo dye.

* * * * *